Nov. 5, 1940.  J. N. SALER  2,220,850
LIQUID CONGEALING APPARATUS
Filed Nov. 24, 1936  2 Sheets-Sheet 1

INVENTOR
JULES N. SALER.

Nov. 5, 1940.                J. N. SALER                 2,220,850
                      LIQUID CONGEALING APPARATUS
                       Filed Nov. 24, 1936         2 Sheets-Sheet 2

WITNESSES:

INVENTOR
JULES N. SALER.
BY
ATTORNEY

Patented Nov. 5, 1940

2,220,850

UNITED STATES PATENT OFFICE 2,220,850

LIQUID CONGEALING APPARATUS

Jules N. Saler, Springfield, Mass., assignor to Westinghouse Electric & Manufacturing Company, East Pittsburgh, Pa., a corporation of Pennsylvania Application November 24, 1936, Serial No. 112,479

4 Claims. (Cl. 62—108.5)

My invention relates to liquid congealing apparatus and particularly to an ice pan and grid structure for forming ice blocks suitable for table use.

It is an object of my invention to provide liquid congealing apparatus from which frozen liquids are readily removable by mechanical means without the necessity of using heat.

It is another object of my invention to provide a flexible grid structure from which frozen liquids are readily removable by flexing portions of the grid and further to provide for readily breaking the ice bond between frozen liquid and the ice pan.

It is still another object of my invention to provide a novel stiffening means for a flexible grid.

It is a further object of my invention to provide an improved metallic flexible grid structure which may be readily raised from the ice pan to break the ice bond between the frozen liquid and the ice pan and which may be easily flexed to remove the frozen liquid therefrom.

These and other objects are effected by my invention as will be apparent from the following description and claims taken in connection with the accompanying drawings, forming a part of this application, in which:

Referring specifically to the drawings for a detailed description of the first embodiment of my invention illustrated in Figs. 1, 2, 5, and 6, numeral 11 designates an ice pan preferably formed of stamped aluminum and being relatively rigid. A removable grid structure, generally indicated by the numeral 12, is disposed in the ice pan 11 and forms therewith a plurality of cells 13 for forming ice blocks (not shown) of a size and shape suitable for domestic or table use.

Figure 1:
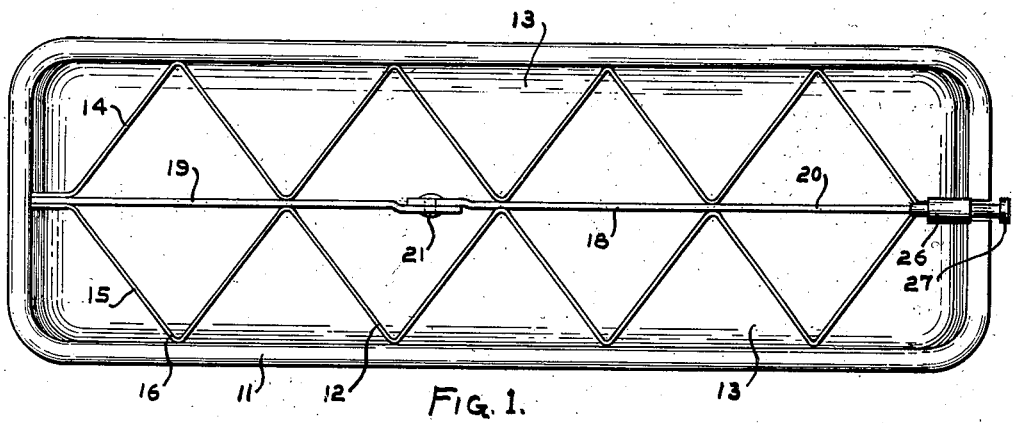
Fig. 1 is a top plan view of an ice pan and flexible grid constructed in accordance with one embodiment of my invention.
Figure 2:
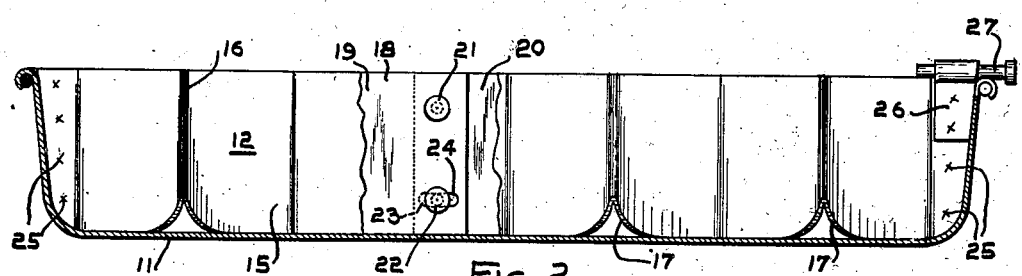
Fig. 2 is a side elevational view of the device shown in Fig. 1 with portions of the ice pan and grid broken away.
Figure 5:
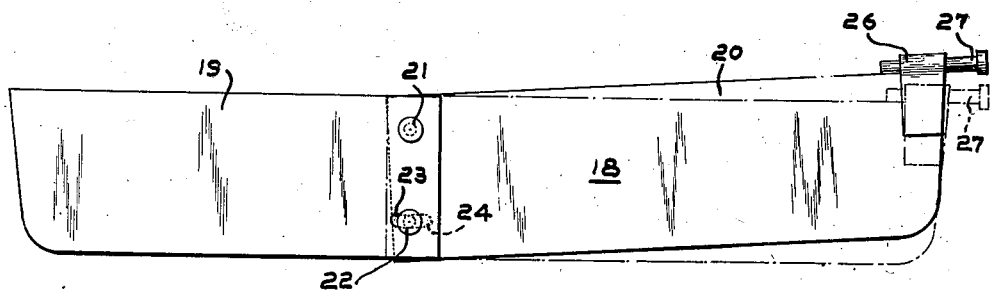
Fig. 5 is a detail view of the stiffening member utilized in the grid structure shown in Figs. 1 and 2; and, Fig. 6 is a perspective view of a lifting device for removing the grid structure from the ice pan, which lifting device is adapted for use with both embodiments of my invention.

The grid structure 12 is formed of two strips of flexible metal 14 and 15, preferably of stainless steel or a similar non-corrosive material, and is bent into zig-zag, or triangular shape, as clearly shown in Fig. 1 with the bottoms of the outside bends 16 cut away as shown at 17, to clear the radii at the bottom of the tray. A central stiffening member generally indicated by numeral 18 is interposed between the flexible bent sheets of metal 14 and 15, which stiffening member is a relatively rigid strip and is preferably also formed of stainless steel. As shown in Figs. 2 and 5, the stiffening member 18 is formed of two strips of metal 19 and 20 which are pivoted to each other at one end by a pin 21. Movement of the two strips 19 and 20 about the pivot 21 is limited however by a second pin 22 extending through the strips 19 and 20 and engaging with slots 23 and 24 provided in the rigid strips 19 and 20, respectively. The inner and outer apices of the flexible sheets 14 and 15 freely abut the member 18 and the pan 11, respectively.

Figure 4:
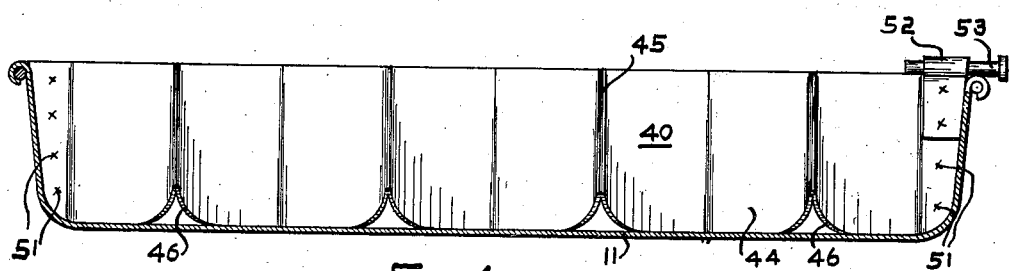
Fig. 4 is a side elevational view of the device shown in Fig. 3 with portions of the ice pan broken away.

As shown in Figs. 2 and 4, the bent flexible metal strips 14 and 15 are joined to the stiffening member 18 near the ends of both, for example, by spot welding, as shown at 25. A piece of metal 26 is spot welded to one end of the grid to hold a pin 27 which overhangs the end of the grid for a purpose hereinafter described, thus completing the grid assembly.

Figure 6:
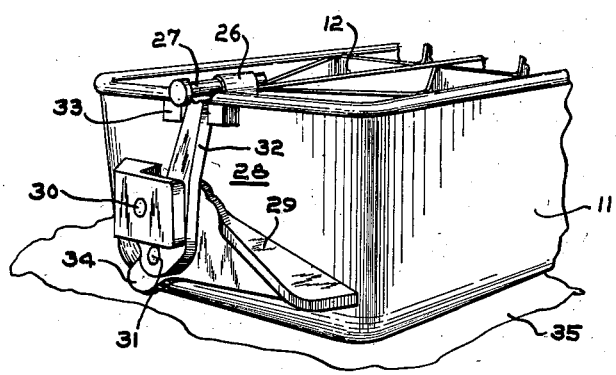

A leverage device, generally indicated at 28, is provided on one end of the ice pan 11, as shown in Fig. 6, and comprises a handle member 29 which is pivotally attached to the ice pan 11 by a pin 30 and which is eccentrically pivoted at 31 to a vertical lifting member 32. The vertical lifting member 32 extends upwardly through guides 33 to engage the pin 27 on the grid structure 12. The handle member 29 is also provided with a toe 34 which engages an ice pan support 35.

In operation, the ice pan 11 is filled with a liquid to be congealed. At such times, the grid is in the position illustrated in Fig. 1 and its plurality of vertically disposed walls therefor define, with the tray, the ice cells 13. It will be noted that, preferably, the central wall member 18 is substantially the same height as the flexible wall members 14 and 15. After the liquid has been frozen, the handle member 29 is operated, thus turning the toe 34 into engagement with the ice pan support 35 for breaking the ice bond therebetween. After the pan is released, the handle 29 is rotated a greater distance, thus bringing the lifting member 32 into engagement with the pin 27 overhanging the end of the ice tray and lifting the end of the grid 12 from the ice tray, thus breaking the bond between the frozen liquid and the interior surfaces of the ice pan. When such lifting force is applied to the end of the flexible grid structure 12, the portions 19 and 20 of the relatively rigid central wall member 18 assume the relative positions shown in Fig. 5, the portions 19 and 20 moving about the pivot 21 and being limited in movement by the pin 22 and the slots 23 and 24. The upward movement of the portion 20 relative to the portion 19 of the rigid member 18 is very slight, the extent of movement of the lifting member 32 being sufficient to raise the entire grid structure from the ice pan 11. The rigid member 18, therefore, stiffens the grid structure 12 in an upward direction so that when force is applied to the end of the flexible grid structure, substantial flexing thereof in an upward direction is prevented.

The slight relative angular movement of the portions 19 and 20 of the central rigid member 18 is sufficient to break the ice bond between the frozen liquid and the rigid member because of the slight relative vertical movement effected between the central rigid strips 19 and 20. Normally, the ice blocks adhere to the flexible strips 14 and 15 and move with the latter rather than the central rigid member 18. Thereafter, the strips 14 and 15 may be taken hold of, preferably near their intermediate portions, and drawn outwardly away from the central rigid member 18 (the grid structure having been removed from the pan) and, in this way, the ice blocks are completely removed from the grid structure.

Another way in which the ice blocks may be removed from a grid structure of this character is to employ the handle 29 to remove the grid structure with the ice assembled therein from the pan, after which the grid structure may be gripped at the ends thereof and torsional movement applied, the entire grid structure being sufficiently flexible for this purpose, and, in this way, the ice blocks will be freed from the flexible strips 14 and 15, and, consequently, entirely liberated from the grid structure.

Figure 3:
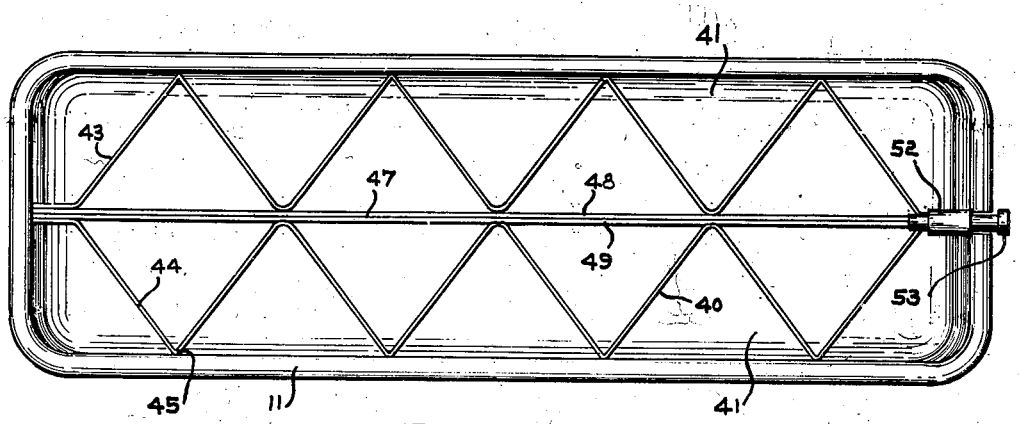
Fig. 3 is a top plan view of a second embodiment of my invention.

Referring now to Figs. 3, 4, and 6 for a detailed description of the second embodiment of my invention, the ice tray 11 and the leverage device 28 are the same as utilized in the first embodiment, and further description thereof is unnecessary. A grid structure, generally indicated by the numeral 40, is disposed in the ice tray 11 in the position shown in Fig. 3 and forms cells 41 for forming blocks of ice (not shown). The grid structure is formed of two strips of flexible metal 43 and 44, preferably stainless steel or other non-corrosive metal, bent to zig-zag or triangular form with their outside bends 45 cut away as shown at 46 to clear the radii at the bottom of the ice pan. A central wall 47 of substantially the same height as the sheets 43 and 44 is interposed between the sheets 43 and 44 and is formed of two sheets of metal 48 and 49, also preferably of stainless steel, which provide a relatively rigid structure in a vertical direction. The two sheets 48 and 49 and the flexible sheets 43 and 44 are joined together at their longitudinal ends, by any suitable means, such as, for example, spot welding, as shown at 51, thus providing a plurality of vertically extending walls, which define with the ice tray, the cells 41. A bent piece of metal 52 is also spot welded to one end of the grid structure 40 to hold a pin 53 which overhangs the end of the grid structure and the pan 11, thus completing the grid structure. It will be noted that the inner and outer apices of the flexible walls 43 and 44 freely abut the central wall member 47 and the ice pan 11, respectively.

In operation, the ice pan 11 is filled with liquid to be frozen and the grid is disposed therein as shown in Fig. 3. When the leverage device 28 is actuated, the vertical lifting member thereof engages the overhanging pin 53, thus raising the grid structure 40 from the ice pan 11. The wall member 47 prevents any substantial upward flexing of the grid structure 40 when lifting force is applied to the end thereof, resulting in raising the entire grid from the ice tray and breaking the bond between the frozen liquid and the interior surfaces of the ice tray. The grid is then flexed by moving the flexible sheets 43 and 44 relative to each other and to the wall member 47, the greatest relative movement again occurring intermediately of the joined ends of the wall member 47 and flexible walls, thus breaking the bond between the frozen liquid and the grid 40. This relative movement may be imparted to the grid structure by moving the flexible wall members in a vertical or in a horizontal direction relative to the wall 47, or by applying torsional force to the ends of the grid.

From the foregoing, it will be apparent that I have provided improved metal liquid congealing apparatus from which frozen liquids may be readily removed without the use of heat and in which novel stiffening means for insuring breaking of the ice bond between the ice tray and the frozen liquid therein is provided.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In liquid congealing apparatus, the combination of a pan for containing liquid to be frozen, and a removable grid member for dividing the pan into a plurality of cells for forming blocks of ice, said grid member embodying a plurality of vertically disposed flexible metallic wall members shaped to define, at least in part, said ice containing cells, said flexible wall members extending longitudinally of the pan structure and disposed adjacent to each other, a relatively rigid wall member formed of a single thickness of material interposed between the flexible wall members, said rigid wall member being formed of two pieces of metal pivotally joined at their inner ends, means for limiting relative movement between said two pieces of metal about said pivot, and means for joining end portions of the relatively rigid wall members and the flexible wall members to afford movement of intermediate portions of the flexible wall members relative to said relatively rigid wall member, said limited movement between the two pieces of metal forming said relatively rigid wall member being effective to at least break some surfaces of said ice blocks from said grid member.

2. In liquid congealing apparatus, the combination of a pan for containing liquid to be frozen, and a removable grid member for dividing the pan into a plurality of cells for forming blocks of ice, said grid member embodying a plurality of vertically disposed flexible metallic wall members shaped to define, at least in part, said ice containing cells, said wall members extending longitudinally of the pan structure and disposed adjacent to each other, a relatively rigid wall member formed of a single thickness of material interposed between the flexible wall members, said rigid wall member being formed of two pieces of metal pivotally joined at their inner ends, means for limiting relative movement between said two pieces of metal about said pivot, means for joining end portions of the relatively rigid wall members and the flexible wall members to afford movement of intermediate portions of the flexible wall members relative to said relatively rigid wall member, and means cooperating with the pan member for raising the grid member relative to the pan member, said limited movement between the two pieces of metal forming the relatively rigid wall member being sufficient to at least break some of the surfaces of said ice blocks from said grid member while being insufficient to permit substantial flexing of the grid structure at the time it is raised from the pan.

3. A grid member for an ice tray comprising a plurality of longitudinally extending flexible wall members formed to at least partially define ice cells, a relatively rigid member interposed between the longitudinally extending walls and joined near its ends to said flexible walls, and force-multiplying means for causing relative movement between said rigid member and said longitudinally extending flexible wall members.

4. In liquid congealing apparatus, the combination of an ice pan containing liquid to be frozen, a grid member for dividing the ice pan into a plurality of cells for forming blocks of ice, means for forcibly breaking the ice bond between the blocks of ice and the ice pan, said grid being formed of walls of flexible metal at least partially defining said ice cells, a central wall member of sufficient rigidity in at least one direction to prevent substantial flexing of said flexible walls while the bond between the ice pan and the ice blocks is being broken, and force-multiplying means for causing relative movement between said rigid wall member and said flexible walls when the means for breaking the ice bond between the ice pan and the ice cubes is operated.

JULES N. SALER.